US009807461B1

(12) United States Patent
Lee

(10) Patent No.: US 9,807,461 B1
(45) Date of Patent: Oct. 31, 2017

(54) COMMUNICATION METHOD, MOBILE TERMINAL

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Chih-Yao Lee, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/168,108

(22) Filed: May 30, 2016

(51) Int. Cl.
H04N 7/16 (2011.01)
H04N 21/478 (2011.01)
H04N 21/61 (2011.01)
H04N 21/41 (2011.01)

(52) U.S. Cl.
CPC ....... *H04N 21/478* (2013.01); *H04N 21/4126* (2013.01); *H04N 21/6125* (2013.01)

(58) Field of Classification Search
CPC ............. H04N 21/478; H04N 21/4126; H04N 21/6125
See application file for complete search history.

(56) References Cited

U.S. PATENT DOCUMENTS

| 9,634,880 B2 * | 4/2017 | Shin | H04L 29/08 |
| 2008/0281926 A1 * | 11/2008 | Walter | H04N 7/163 |
| | | | 709/206 |
| 2013/0138726 A1 * | 5/2013 | Shin | H04L 29/08 |
| | | | 709/203 |
| 2016/0050190 A1 * | 2/2016 | Mooij | H04L 12/2803 |
| | | | 380/279 |
| 2016/0182624 A1 * | 6/2016 | Liang | H04W 12/06 |
| | | | 709/228 |

FOREIGN PATENT DOCUMENTS

CN 101063999 A 10/2007
CN 104053046 A 9/2014

OTHER PUBLICATIONS

Anthony Ha, "With Clik, Your Smartphone Can Control Screens Everywhere", TC News, Feb. 16, 2012.*

* cited by examiner

*Primary Examiner* — James R Marandi
(74) *Attorney, Agent, or Firm* — Steven Reiss

(57) ABSTRACT

A method of communication applied in a mobile terminal for projecting a file or content onto a display device through a set-top box (STB). The mobile terminal sends a request packet for requesting or triggering the STB to generate and display first identification information in a display area. When the first identification information displayed is scanned, and second identification information, should be identical to or should correspond to the first identification information, is generated by the STB. A comparison between the first identification information and the second identification information establishes authenticity and thus the identity of the sending mobile terminal, and the file or the content in the mobile terminal is then projected onto the display area of the correct display device through the STB. A second communication method, a mobile terminal, and a set-top box are also disclosed.

30 Claims, 8 Drawing Sheets

COMMUNICATION METHOD, MOBILE TERMINAL

FIELD

The subject matter herein generally relates to communication technology.

BACKGROUND

Projecting multimedia files from mobile devices onto a large display device, for example, a TV, via a set top box (STB) is a popular application service. Thus, users can watch a movie or share photos with friends through the TV. Traditionally, users select the name of a STB through a screen of a mobile terminal, and the mobile terminal projects multimedia files or contents onto a display device connecting with the STB. However, when there are multiple large display devices connecting with STBs, it is easy to choose a wrong display device for data projection.

BRIEF DESCRIPTION OF THE DRAWINGS

Implementations of the present technology will now be described, by way of example only, with reference to the attached figures.

DETAILED DESCRIPTION

Figure 1:
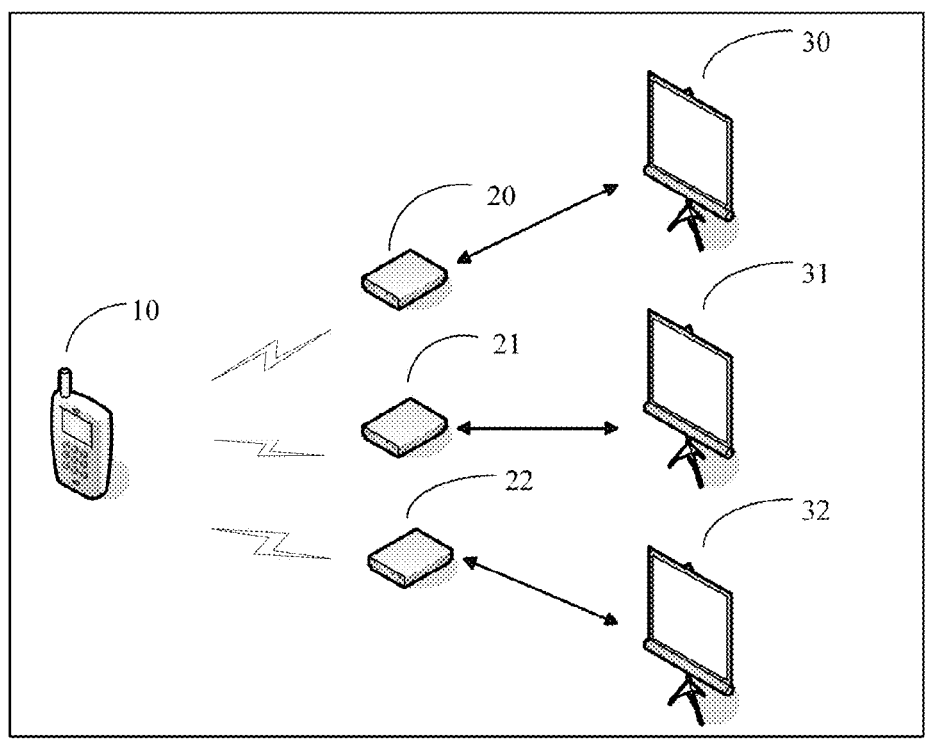
FIG. 1 illustrates an architecture of an embodiment of a mobile terminal and a set top box (STB) of a communication method.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

It should be noted that references to "an" or "one" embodiment in this disclosure are not necessarily to the same embodiment, and such references mean "at least one."

In general, the text "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates an embodiment of a mobile terminal and a set top box (STB) working together. In this embodiment, mobile terminals and STBs communicate through a first network, the first network may be based on BLUETOOTH™, ZIGBEE, Wi-Fi or other short-range wireless network. STBs and display devices communicate through a second network, the second network may be a wired network or a short-range wireless network. The first network and the second network may each be a single network or a combination of different networks.

In this embodiment, a mobile terminal 10 connects with STBs 20-22 based on WI-FI, each STB connects with one of display devices 30-32 through a wired network, such as an AV cable or HDMI cable. The file or the content in the mobile terminal 10 is projected onto the display device by one of the STBs, wherein the relationship between the STB and the display device is corresponding. In other words, the content in the STB 20 is displayed in the display device 30, the content in the STB 21 is displayed in the display device 31, and the content in the STB 22 is displayed in the display device 32.

In this embodiment, the mobile terminal 10, the STB 20, and the display device 30 serve as an example.

Figure 2:
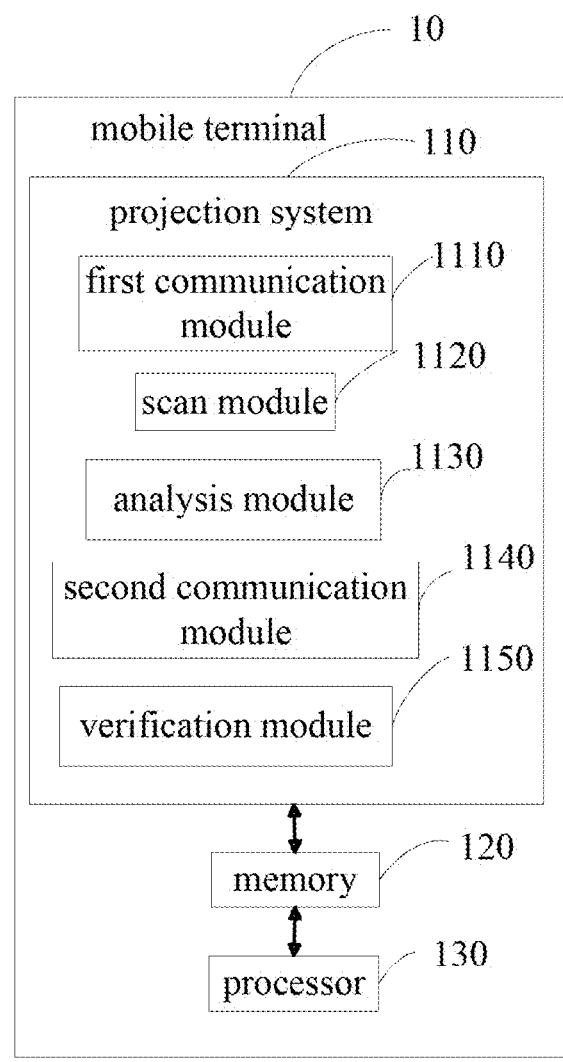
FIG. 2 illustrates a block diagram of one embodiment of functional modules of the mobile terminal.

FIG. 2 illustrates one embodiment of functional modules of the mobile terminal 10. The mobile terminal 10 may be any mobile multimedia electronic device. The mobile terminal 10 includes a projection system 110, a memory 120, and a processor 130. The projection system 110 includes a first communication module 1110, a scan module 1120, an analysis module 1130, a second communication module 1140, and a verification module 1150. The modules 1110-1150 are configured to be executed by one or more processors to perform their respective functions. In this embodiment, the modules are executed by a processor 30. Each module of the present disclosure is a computer program for a specific function. A memory 120 stores the code of the program 110 and other information of the mobile terminal 10.

Figure 3:
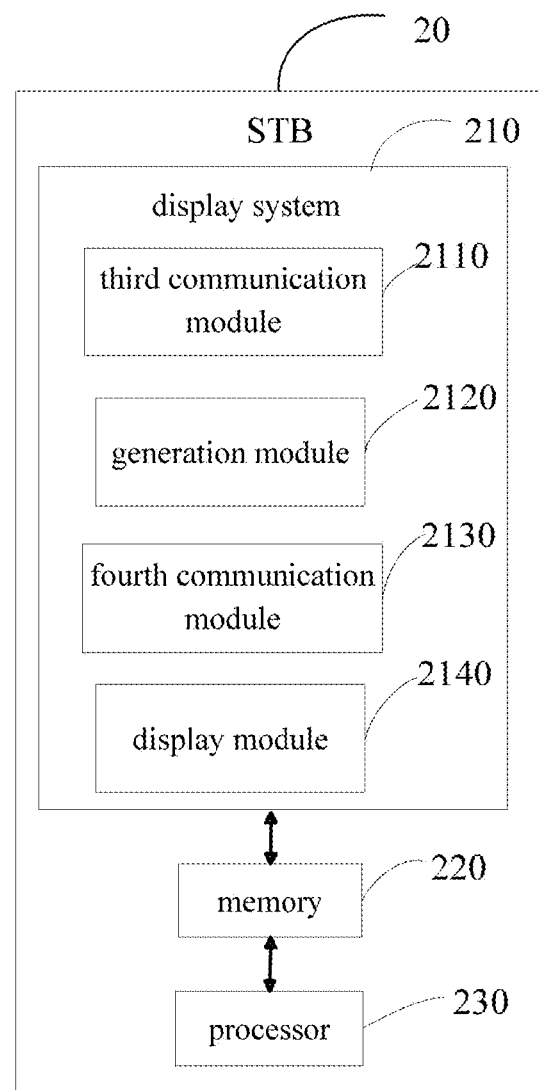
FIG. 3 illustrates a block diagram of one embodiment of functional modules of the STB.

FIG. 3 illustrates one embodiment of functional modules of the STB. The STB 20 includes a display system 210, a memory 220, and a processor 230. The display system 210 includes a third communication module 2120, a generation module 2110, a fourth communication module 2130, and a display module 2140. The modules 2110-2140 are configured to be executed by one or more processors to perform their respective functions. In this embodiment, the modules are executed by a processor 230. Each module of the present disclosure is a computer program for a specific function. A memory 220 stores the code of the program 210 and other information of the mobile terminal 10. In this embodiment, the third communication module 2110 and the fourth communication module 2130 receive data in the form of packets of information, files, or contents from the mobile terminal 10.

Figure 4:
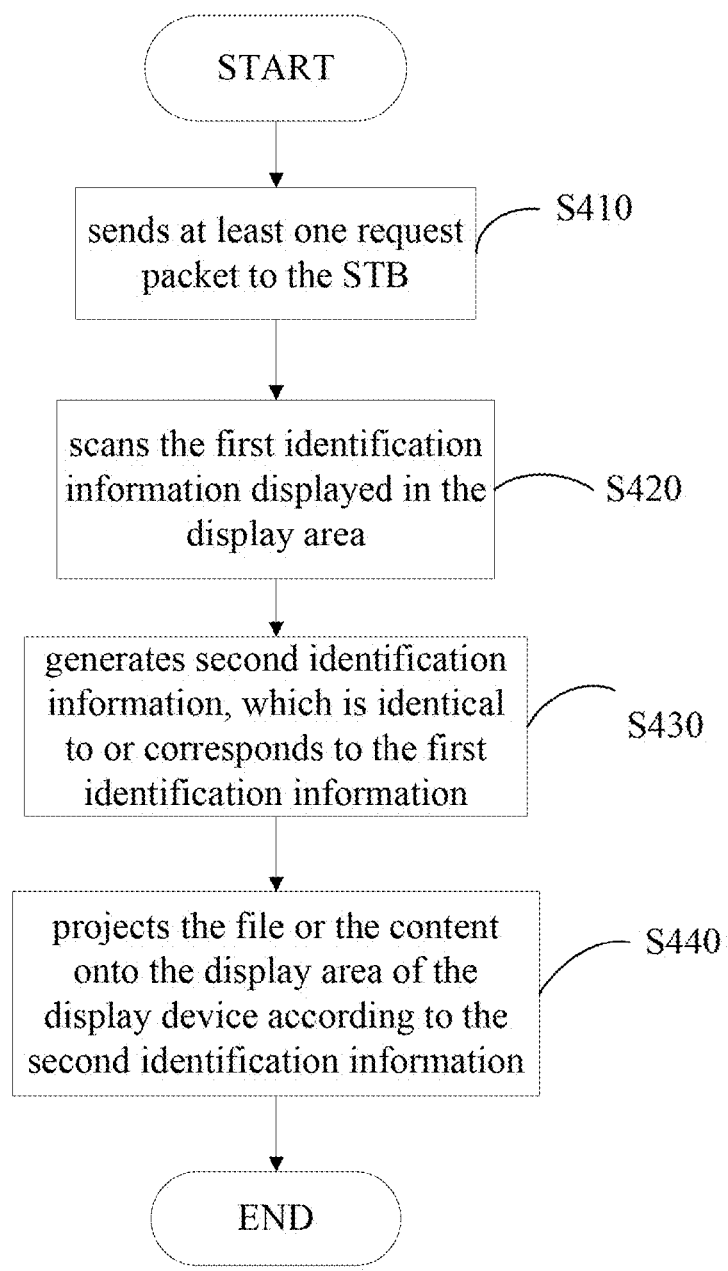
FIG. 4 illustrates a flowchart of one embodiment of a communication method for the mobile terminal.

FIG. 4 illustrates a flowchart of one embodiment of a communication method for the mobile terminal. The implementation subject of the method can be the mobile terminal. For example, in this embodiment, the mobile terminal 10 projects the file or the content onto the display device 30 through the STB 20.

At block 410, the first communication module 1110 of the mobile terminal 10 sends at least one request packet to the STB 20, wherein the request packet requests or triggers the STB 20 to generate first identification information and display the first identification information in the display area 30. In this embodiment, the first communication module 1110 can send the request packet by broadcasting. After receiving the request packet, the STB 20 analyzes the request packet, generates the first identification information according to the request packet and displays the first identification information in the display area of the display device 30.

In one embodiment, the request packet includes a location parameter for indicating a coordinate position or a relative position of the first identification information in the display area. The coordinate position is a specific position of the first identification information in the display area, and the relative position is a position of the specific position of the first identification information in the same proportion.

In one embodiment, the request packet includes a flicker frequency parameter for indicating a flicker frequency of the first identification information in the display area. In the embodiment, the STB 20 controls the display device 30 to alternately display the identification information (e.g. two-dimensional code) and a red area at the flicker frequency.

In one embodiment, the request packet includes a size parameter for indicating a relative size value or an absolute size value of the first identification information in the display area. After analyzing the size parameter, the STB 20 controls the display device 30 to display the first identification information in the display area according to the size parameter. For example, when the size parameter is 5 cm*5 cm, the STB 20 displays the first identification information in the display device according to the size parameter 5 cm*5 cm. When a ratio of a width of the first identification information to a width of the display area of the display device 30 is 1:10, and the width of the display area of the display device 30 is 30 inches, the STB 30 controls the display device 30 to display the first identification information in an area 3 inches wide. Such width may be applied to an edge, a diagonal, a perimeter, or an overall area.

In one embodiment, the request packet includes a first identity information of the mobile terminal 10. After analyzing the first identity information, the STB 20 generates the first identification information including the first identity information and address of the STB 20 itself.

The first identification information may be displayed as a form of two-dimensional code, a bar code, text, or as a picture. In the embodiment, the preferred display mode of the first identification information is as a two-dimensional code.

At block 420, the scanning module 1120 of the mobile terminal 10 scans the first identification information displayed in the display area. In order to improve the accuracy and speed of scanning, the following features can be included.

First implementation method: when the request packet includes the position parameter, the scanning module 1120 establishes positions the first identification information in the display area according to the position parameter, determines a scanning area, and scans the scanning area.

In an example, the scanning module 1120, in recognizing the display area, drives a camera to shoot, first of all according to similarities and differences between the identified display area and background color in the shooting range. The module 120 then positions the first identification information in the display area according to the position parameter, and then determines the area is the scanning area, so driving a camera to focus on the scanning area to achieve a clear scan of the scanning area.

Second implementation method: when the flicker frequency parameter is included in the request packet, the scanning module 1120 takes the flicker frequency parameter as a reference value, identifies a sub display area (i.e. the display area of the first identification information) wherein a flicker frequency of the sub display area is identical to the reference value, and then scans the sub display area.

In the embodiment, when the sub display area is identified, then the scanning module performs a scanning operation to the sub display area, and executes the block 430. When identification of the first identification information fails, the scanning module 1120 executes block 420 until the scanning module 1120 can recognize the sub display area.

Third implementation method: when the scanning module fails to scan the first identification information or analysis of a scan result fails within a preset period of time, size adjustment information is transmitted to the STB through the first communication 1110, wherein the size adjustment information requires the STB to adjust the display size of the first identification information in the display device.

The size adjustment information includes a display width in the display device. The display width is represented by $W=C*Ptv*(Wphone/Pphone)$, wherein C is a constant, Ptv is a current display width of the first identification information in the display device, Wphone stands for a screen width of the mobile terminal, and Pphone stands for a current display width of the first identification information in the mobile terminal. Adjustment of the display size is only one exemplary operation, other display parameters, such as resolution, brightness, and contrast, can also be adjusted.

The implementation of above methods can be implemented in a single execution, a parallel execution, or an ordered execution.

At block 430, the analysis module 1130 of the mobile terminal 10 generates second identification information, which is identical to or corresponds to the first identification information. In this embodiment, the analysis module 1130 analyzes the scanned information in order to generate the second identification information. The second identification information is the result of analysis of the scanning result of the first identification information, so that the second identification information is identical to or corresponds to the first identification information. For example, the first identification information includes the address of the STB 20, and the second identification information can also include the address of the STB 20.

At block 440, the second communication module 1140 of the mobile terminal 10 projects the file or the content onto the display area of the display device according to the second identification information, wherein the display device is connected with the STB 20.

In one embodiment, the mobile terminal 10 also includes a verification module 1150 for verifying the authenticity of the second identification information. The execution by the verification module 1150 comprises a determination that the request packet (sent by the first communication module 1110 to the STB 20) does include the first identity information of the mobile terminal 10 itself, and that the first identity information is embedded into the first identification information. After the scanning module 1120 scans the first identification information, the second identification information which is analyzed according to the scan results also includes the second identity information of the mobile terminal 10.

The mobile terminal 10 obtains the second identity information before the operation of the verification module 1150 and determines whether the second identity information of the mobile terminal that is contained in the second identification information mobile terminal is identical to the first identity information of the mobile terminal 10. This is to ensure the authenticity or validity of the second identification information. The operation of the verification module 1150 avoids other mobile terminals projecting the first identification information onto the display device through the STB 20.

For example, a mobile terminal A and a mobile terminal B each transmits request packets to the STB 20. In response to the request packets of the mobile terminal A, the STB 20 displays the first identification information in the display device, but a user of the mobile terminal B may believe that the first identification information displayed in the display device is obtained in response to his request packet of mobile terminal B. Then, the user of the mobile terminal B may scan the first identification information and generate an erroneous second identification information based on the mobile terminal A. The mobile terminal B user may send projection content to the display device according to the erroneous second identification information, which can result in incorrect projections between the mobile terminal A and the mobile terminal B.

In this embodiment, the verification module 1150 can eliminate incorrect projections. Specifically, the verification module 1150 determines whether the second identification information of the second identity information is identical to the first identity information of the mobile terminal 10, and also determines whether the address of the second identification information is valid according to the result of a comparison. In this embodiment, if the second identity information is identical to the first identity information, the verification module 1150 can determine that the address of the second identification information is valid, otherwise it is deemed invalid.

Figure 5:
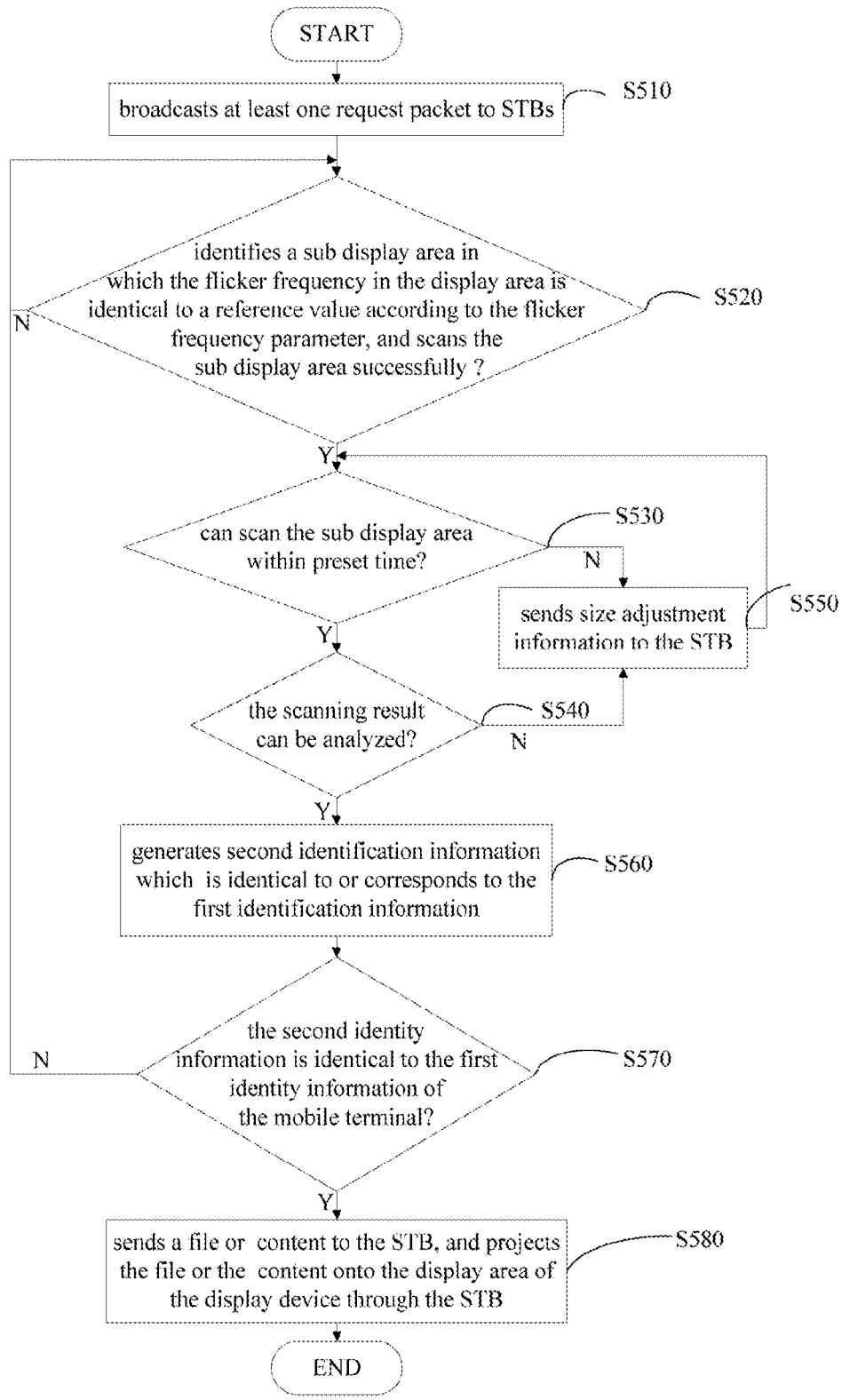
FIG. 5 illustrates a flowchart of one embodiment of a communication method for the mobile terminal.

FIG. 5 illustrates a specific example to further explain the communication method.

At block 510, the mobile terminal 10 broadcasts at least one request packet to STBs 20-22. The request packet includes a flicker frequency parameter. After receiving the request packet, STB 20 generates first identification information and displays the first identification information in the display area of the display device 30 according to the flicker frequency parameter.

At block 520, the mobile terminal 10 identifies a sub display area in which the flicker frequency in the display area is identical to a reference value according to the flicker frequency parameter, and scans the sub display area. If the sub display area can be identified, block 530 is executed, if not, block 520 is executed.

At block 530, the mobile terminal 10 scans the sub display area. If the mobile terminal 10 can scan the sub display area within preset time, block 540 is executed, if not, block 550 is executed.

At block 540, the mobile terminal 10 analyzes a scanning result. If the scanning result can be analyzed, block 560 is executed, if not, block 550 is executed.

At block 550, the mobile terminal 10 sends size adjustment information to the STB 20. The block 530 returns to be executed when the first identification information is adjusted, until the mobile terminal 10 can complete a scan in the preset time and can analyze the scan result.

At block 560, the mobile terminal 10 generates second identification information which is identical to or corresponds to the first identification information.

At block 570, the mobile terminal 10 determines whether the second identity information is identical to the first identity information of the mobile terminal 10. If the second identity information is identical to the first identity information, block 580 is executed, if not, block 520 returns to be executed.

At block 580, the mobile terminal 10 sends a file or content to the STB 20, and projects the file or the content onto the display area of the display device through the STB 20.

Figure 6:
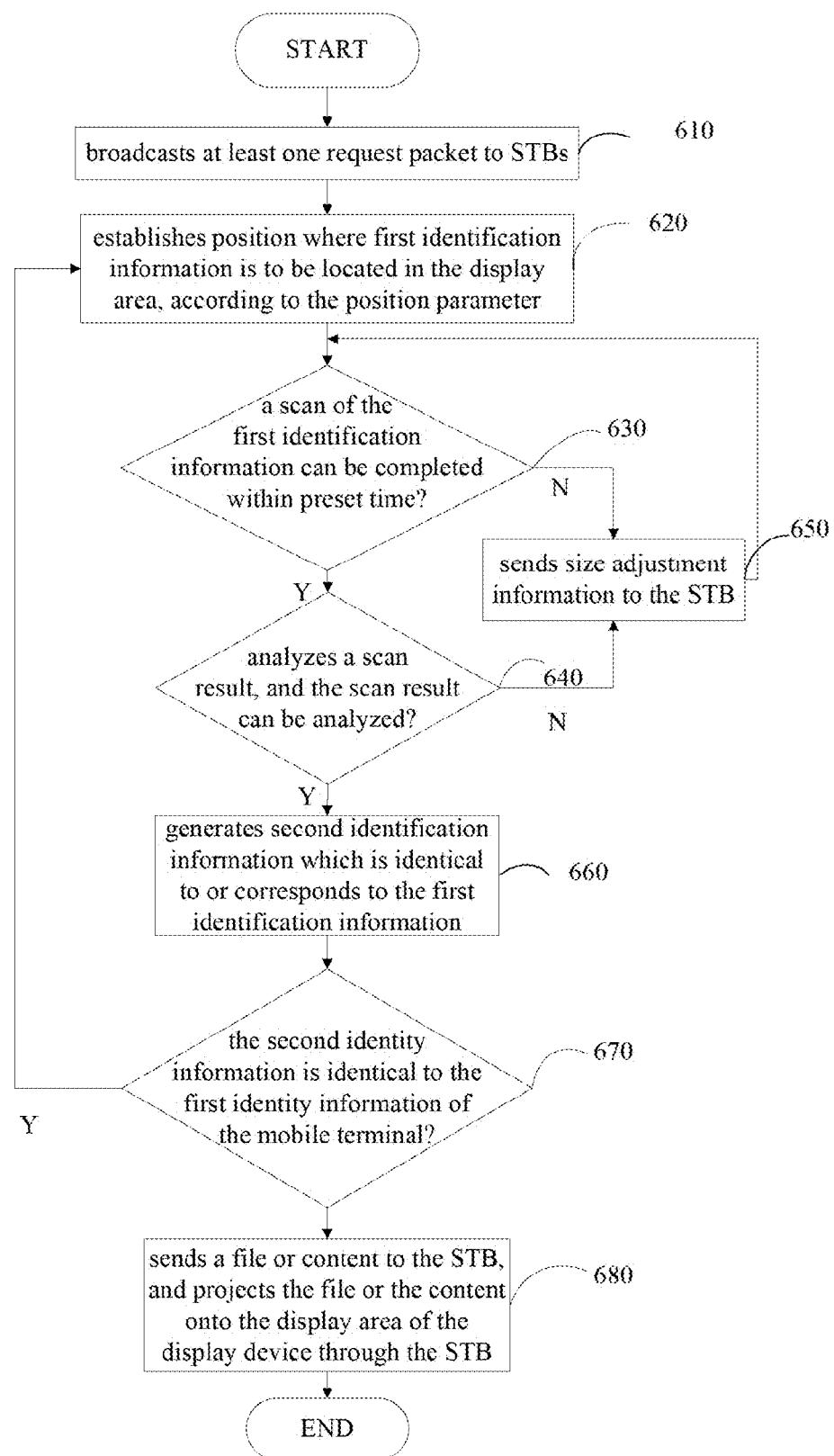
FIG. 6 illustrates a flowchart of another embodiment of a communication method for the mobile terminal.

FIG. 6 illustrates a flowchart of another embodiment of a communication method for the mobile terminal, the method comprising:

At block 610, the mobile terminal 10 broadcasts at least one request packet to STBs 20-22.

At block 620, the mobile terminal 10 establishes position where first identification information is to be located in the display area, according to the position parameter.

At block 630, the mobile terminal 10 scans the first identification information If a scan of the first identification information can be completed within preset time, block 640 is executed, if not, block 650 is executed.

At block 640, the mobile terminal 10 analyzes a scan result. If the scan result can be analyzed, block 660 is executed, if not, block 650 is executed.

At block 650, the mobile terminal 10 sends size adjustment information to the STB 20. The block 630 returns to be executed when the first identification information is adjusted, until the mobile terminal 10 is able to scan in the preset time.

At block 660, the mobile terminal 10 generates second identification information which is identical to or corresponds to the first identification information.

At block 670, the mobile terminal 10 determines whether the second identity information is identical to the first identity information of the mobile terminal 10. If the second identity information is identical to the first identity information, block 680 is executed, if not, block 620 returns to be executed.

At block 680, the mobile terminal 10 sends a file or content to the STB 20, and projects the file or the content onto the display area of the display device through the STB 20.

Figure 7:
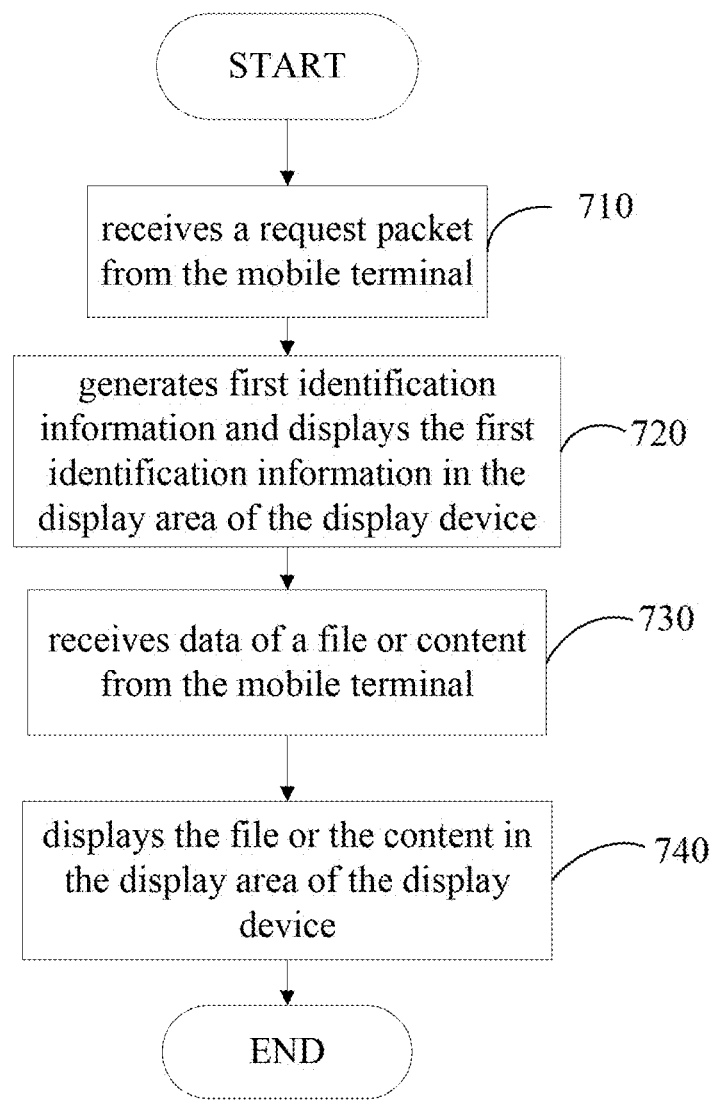
FIG. 7 illustrates a flowchart of an embodiment of a communication method for the STB.

FIG. 7 illustrates a flowchart of an embodiment of a communication method for the STB. The method can be executed in a STB or a similar device. For example, in the embodiment, the mobile terminal 10 projects the file or the content onto the display device 30 through the STB 20.

At block 710, the third communication module 2110 of the STB 20 receives a request packet from the mobile terminal 10. The request packet can be broadcast. The STB 20 within the broadcast coverage range can receive the request packet. The request packet includes (but is not limited to including) a position parameter, a flicker frequency parameter, a size parameter, and/or a first identification information.

At block 720, the generation module 2120 of the STB 20 generates first identification information and displays the first identification information in the display area of the display device 30. When the request packet is received by the third communication 2110, the generation module 2120 displays the first identification information in the display area of the display device 30 according to the information of the request packet.

The following features are included:

First, when the request packet includes a position parameter, the position parameter can require a relative position or a coordinate position of the first identification information in the display area. The generation module 2120 will thus display the first identification information in a position according to the position parameter.

Second, when the request packet includes a flicker frequency parameter, the flicker frequency parameter can require a particular flicker frequency of the first identification information in the display area. The generation module 2120 will thus display the first identification information in the display area according to the flicker frequency parameter.

Third, when the request packet includes a size parameter, the size parameter can require a relative size value or absolute size value of the first identification information in the display area. The generation module 2120 will thus display the first identification information in the display area according to the size parameter.

The implementation of above methods can be implemented in a single execution, in a parallel execution, or in an ordered execution.

In one embodiment, when the request packet includes first identity information of the mobile terminal 10, the generation module 2120 generates the first identification information based on the first identity information and address information of the STB 20 itself. In this case, the first identification information includes the first identity information and the address.

The following features explain the way of displaying the first identification information:

First, the STB 20 displays the first identification information in the display area of the display device for a duration which is longer than preset time, and does not hide or stop the display of the first identification information until a stop display packet is received from the mobile terminal 10.

Second, when the STB 20 receives a stop display packet, the display of the first identification information is stopped or hidden.

Third, when the size adjustment information from the mobile terminal 10 is received, the STB 20 analyzes the size adjustment parameter, and adjusts the display of the first identification information according to the size parameter.

The implementation of above processes can be implemented in a single execution, a parallel execution, or an ordered execution.

At block 730, the fourth communication module 2130 receives data of a file or content from the mobile terminal 10.

At block 740, the display module 2140 displays the file or the content in the display area of the display device 10.

Figure 8:
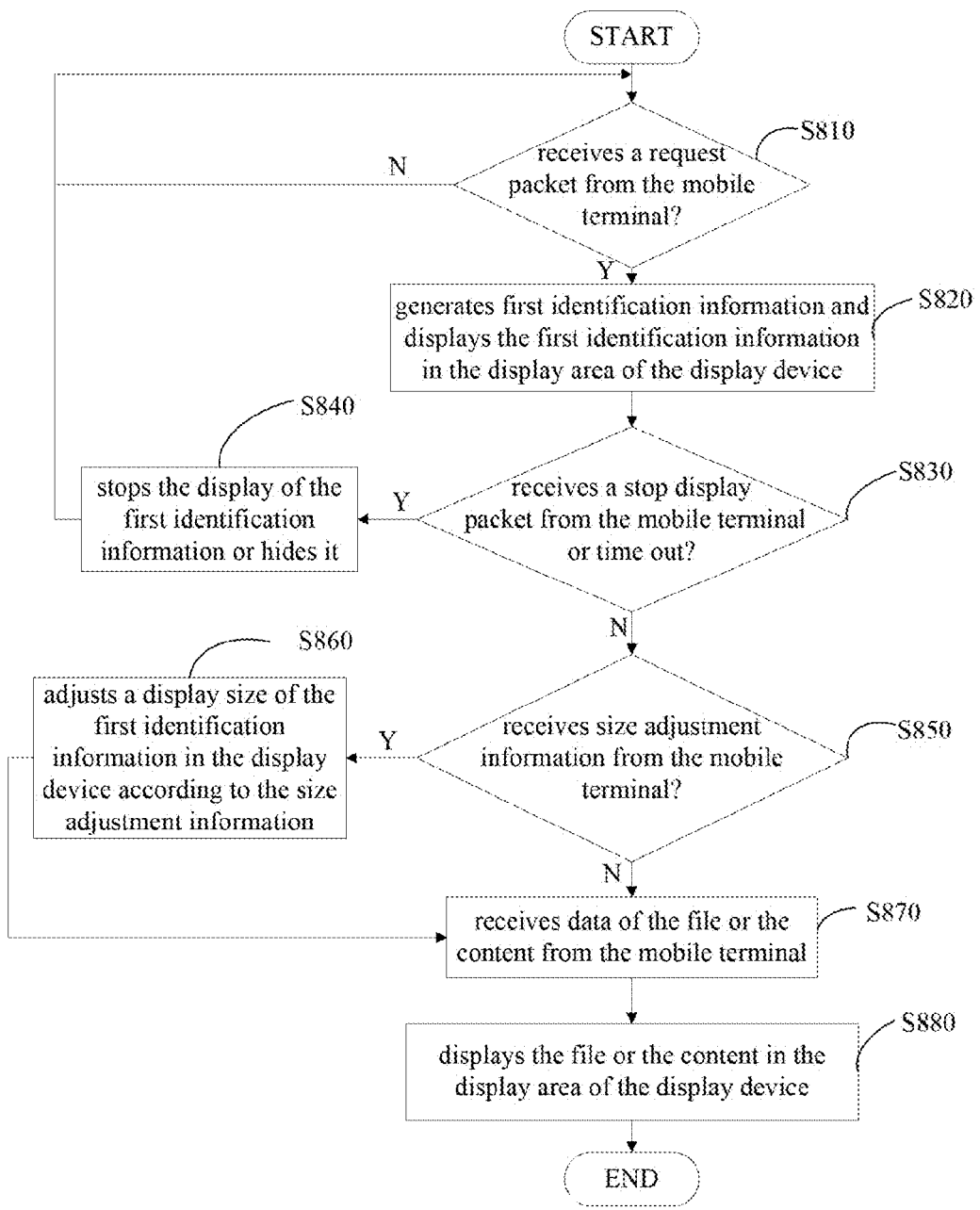
FIG. 8 illustrates a flowchart of an embodiment of a communication method for the STB.

FIG. 8 illustrates a flowchart of an embodiment of a communication method for the STB.

At block 810, when the STB 20 receives a request packet from the mobile terminal 10, block 820 is executed. Until a request packet is received from mobile terminal 10, the block 810 is executed.

At block 820, the STB 20 generates first identification information and displays the first identification information in the display area of the display device 30.

At block 830, block 840 is executed when the STB 20 receives a stop display packet from the mobile terminal 10 or time out (that is to say, the display of the first identification information being continued for longer than preset time), if the block 840 is not applied, block 850 is executed.

At block 840, the STB 20 stops the display of the first identification information or hides it.

At block 850, when the STB 20 receives size adjustment information from the mobile terminal 10, block 860 is executed; if not, block 870 is executed.

At block 860, the STB 20 adjusts a display size of the first identification information in the display device 30 according to the size adjustment information.

At block 870, the STB 20 receives data of the file or the content from the mobile terminal 10.

At block 880, the STB 20 displays the file or the content in the display area of the display device.

These communication methods for the mobile terminal and the STB enable projection of the file or the content from the mobile terminal onto the display device connecting with the STB. It is effectively to avoid the elderly to project the file or the content onto the display device connecting with non specified STB in the condition of memory loss. These methods are fast, accurate, and convenient for projecting the file or the content onto the right display device.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A communication method operable to be executed in a mobile terminal, the mobile terminal being configured for projecting a file or content in the mobile terminal onto a display device through a set top box (STB), the method comprising:

sending at least one request packet for requesting or triggering the STB to generate first identification information and display the first identification information in a display area of the display device, wherein the at least one request packet comprises: a position parameter, indicating a relative position or a coordinate position of the first identification information in the display area; a flicker frequency parameter, indicating a flicker frequency of the first identification information in the display area; a size parameter, indicating a relative size value or an absolute size value of the first identification information in the display area; and/or first identity information of the mobile terminal;

scanning the first identification information displayed in the display area;

generating second identification information, which is identical or corresponding to the first identification information; and projecting the file or the content in the mobile terminal onto the display area of the display device through the STB.

2. The communication method as claimed in claim 1, wherein the scanning step further comprises:
  positioning the first identification information in the display area according to the position parameter;
  determining a scanning area; and
  scanning the scanning area.

3. The communication method as claimed in claim 1, wherein the scanning step further comprises:
  taking the flicker frequency parameter as a reference value;
  identifying a sub display area, wherein a flicker frequency of the sub display area is identical to the reference value; and
  scanning the sub display area.

4. The communication method as claimed in claim 1, wherein the first identification information includes address information of the STB and the first identity information of the mobile terminal.

5. The communication method as claimed in claim 1, wherein the second identification information includes second address information and second identity information, wherein after the generating step is performed, further comprising:
  comparing whether the second identity information in the second identification information is identical to the first identity information of the mobile terminal; and
  determining legality of the second address information based on the compared result.

6. The communication method as claimed in claim 1, wherein the scanning step further comprises:
  when it is failed to scan the first identification information or failed to analyze the scanning result within a preset period of time, sending size adjustment information to the STB, wherein the size adjustment information is used for indicating the STB to adjust a display size of the first identification information in the display device.

7. The communication method as claimed in claim 6, wherein the size adjusting information includes a display width in the display device, the display width is represented by W=C*Ptv*(Wphone/Pphone), wherein C is a constant, Ptv is a current display width of the first identification information in the display device, Wphone stands for a screen width of the mobile terminal, and Pphone stands for a current display width of the first identification information in the mobile terminal.

8. The communication method as claimed in claim 1, wherein a display mode of the first indication information includes a two-dimensional code, a bar code, a text or a picture.

9. A communication method operable to be executed in a set top box (STB), the STB displays a file or content in a mobile terminal in a display device connecting with the STB, the method comprising:
  receiving a request packet from the mobile terminal, wherein the request packet includes a position parameter, the position parameter indicates a relative position or a coordinate position of the first identification information in the display area, the step of displaying the first identification information further comprises: positioning the first identification information in the display area according to the position parameter;
  generating first identification information;
  displaying the first identification information in a display area of the display device;
  receiving the file or the content from the mobile terminal; and
  displaying the file or the content in the display area of the display device.

10. The communication method as claimed in claim 9, wherein the request packet includes a flicker frequency parameter, wherein the flicker frequency parameter indicates a flicker frequency of the first identification information in the display area, the step of displaying the first identification information further comprises:
  displaying the first identification information in the display area according to the flicker frequency parameter.

11. The communication method as claimed in claim 9, wherein the request packet includes a size parameter, wherein the size parameter indicates a relative size value or an absolute size value of the first identification information in the display area, the step of generating the first identification information and the step of displaying the first identification information further comprises:
  displaying the first identification information in the display area according to the size parameter.

12. The communication method as claimed in claim 9, wherein the request packet includes first identity information of the mobile terminal, the first identification information includes the first identity information of the mobile terminal and address information of the STB.

13. The communication method as claimed in claim 9, wherein displaying the first identification information in the display area of the display device during duration time which is longer than preset time, and not receiving a stop display packet from the mobile terminal during the duration time, stopping displaying or hiding the first identification information.

14. The communication method as claimed in claim 9, wherein the step of displaying the first identification information further comprises:
  receiving size adjustment information from the mobile terminal;
  adjusting a display size of the first identification information in the display device.

15. The communication method as claimed in claim 9, wherein a display mode of the first indication information includes a two-dimensional code, a bar code, a text or a picture.

16. A mobile terminal, which projects a file or content onto a display device through a set top box (STB), comprising:
  a wireless communication unit for communicating with the STB;
  at least one processor;
  a non-transitory storage system coupled to the at least one processor and configured to store one or more programs configured to be executed by the at least one processor, the one or more programs comprise instructions for:
  sending at least one request packet, the request packet for requesting or triggering the STB to generate first identification information and display the first identification information in a display area, wherein the request packet comprises: a position parameter, indicating a relative position or a coordinate position of the first identification information in the display area; a flicker frequency parameter, indicating a flicker frequency of the first identification information in the display area; a size parameter, indicating a relative size value or an absolute size value of the first identification information in the display area; and/or first identity information of the mobile terminal;
  scanning the first identification information displayed in the display area;

generating second identification information, which is identical or corresponding to the first identification information; and projecting the file or the content in the mobile terminal onto the display area of the display device in through the STB.

17. The mobile terminal as claimed in claim 16, wherein the one or more programs further comprise instructions for:
positioning the first identification information in the display area according to the position parameter;
determining a scanning area; and
scanning the scanning area.

18. The mobile terminal as claimed in claim 16, wherein the one or more programs further comprise instructions for:
taking the flicker frequency parameter as a reference value;
identifying a sub display area, wherein a flicker frequency of the sub display area is identical to the reference value; and
scanning the sub display area.

19. The mobile terminal as claimed in claim 16, wherein the first identification information includes address information of the STB and the first identity information of the mobile terminal.

20. The mobile terminal as claimed in claim 16, wherein the second identification information includes second address information and second identity information, wherein the one or more programs further comprise instructions for:
comparing whether the second identity information in the second identification information is identical to the first identity information of the mobile terminal; and
determining legality of the second address information based on the compared result.

21. The mobile terminal as claimed in claim 16, wherein the one or more programs further comprise instructions for:
when it is failed to scan the first identification information or failed to analyze the scanning result within a preset period of time, sending size adjustment information to the STB, wherein the size adjustment information is used for indicating the STB to adjust a display size of the first identification information in the display device.

22. The mobile terminal as claimed in claim 21, the size adjusting information includes a display width in the display device, the display width is represented by W=C*Ptv*(Wphone/Pphone), wherein C is a constant, Ptv is a current display width of the first identification information in the display device, Wphone stands for a screen width of the mobile terminal, and Pphone stands for a current display width of the first identification information in the mobile terminal.

23. The mobile terminal as claimed in claim 16, wherein a display mode of the first indication information includes a two-dimensional code, a bar code, a text or a picture.

24. A set top box (STB), which displays a file or content from a mobile terminal in a display device connecting with the STB, comprising:
a first wireless communication unit for communicating with the mobile terminal;
a second wireless or a wired communication unit for communicating with the display device;
at least one processor;
a non-transitory storage system coupled to the at least one processor and configured to store one or more programs configured to be executed by the at least one processor, the one or more programs comprise instructions for:
receiving a request packet from the mobile terminal, wherein the request packet includes a position parameter, the position parameter indicates a relative position or a coordinate position of the first identification information in the display area, the one or more programs further comprise instructions for: positioning the first identification information in the display area according to the position parameter;
generating first identification information and displaying the first identification information in a display area of the display device;
receiving the file or the content from the mobile terminal; and
displaying the file or the content in the display area of the display device.

25. The STB as claimed in claim 24, wherein the request packet includes a flicker frequency parameter, the flicker frequency parameter indicates a flicker frequency of the first identification information in the display area, the one or more programs further comprise instructions for:
displaying the first identification information in the display area according to the flicker frequency parameter.

26. The STB as claimed in claim 24, wherein the request packet includes a size parameter, the size parameter indicates a relative size value or an absolute size value of the first identification information in the display area, the one or more programs further comprise instructions for:
displaying the first identification information in the display area according to the size parameter.

27. The STB as claimed in claim 24, wherein the request packet includes first identity information of the mobile terminal, the first identification information includes the first identity information of the mobile terminal and address information of the STB.

28. The STB as claimed in claim 24, wherein the STB displays the first identification information in the display area of the display device during duration time which is longer than preset time, and does not receive a stop display packet from the mobile terminal during the duration time, stops displaying or hides the first identification information.

29. The STB as claimed in claim 24, wherein the one or more programs further comprise instructions for:
receiving size adjustment information from the mobile terminal; and
adjusting a display size of the first identification information in the display device.

30. The STB as claimed in claim 24, wherein a display mode of the first indication information includes a two-dimensional code, a bar code, a text or a picture.

* * * * *